(12) United States Patent
Liu et al.

(10) Patent No.: US 11,314,062 B2
(45) Date of Patent: Apr. 26, 2022

(54) COLLIMATING LENS, PROJECTING MODULE AND MOBILE PHONE

(71) Applicant: JIANGXI LIANYI OPTICS CO., LTD., Nanchang (CN)

(72) Inventors: Xuming Liu, Nanchang (CN); Haojie Zeng, Nanchang (CN); Jiyong Zeng, Nanchang (CN)

(73) Assignee: JIANGXI LIANYI OPTICS CO., LTD., Nanchang (CN)

( * ) Notice: Subject to any disclaimer, the term of this patent is extended or adjusted under 35 U.S.C. 154(b) by 260 days.

(21) Appl. No.: 16/854,896

(22) Filed: Apr. 22, 2020

(65) Prior Publication Data

US 2020/0249446 A1    Aug. 6, 2020

Related U.S. Application Data

(63) Continuation of application No. PCT/CN2019/113104, filed on Oct. 24, 2019.

(30) Foreign Application Priority Data

Dec. 11, 2018  (CN) .......................... 201811512730.4

(51) Int. Cl.
*H04N 5/225* (2006.01)
*G02B 9/14* (2006.01)
(Continued)

(52) U.S. Cl.
CPC ......... *G02B 13/0055* (2013.01); *G02B 7/008* (2013.01); *G02B 13/0035* (2013.01);
(Continued)

(58) Field of Classification Search
CPC . H04N 5/2254; H04N 5/2257; H04M 1/0264; G02B 9/14; G02B 13/0055; G02B 27/30
(Continued)

(56) References Cited

U.S. PATENT DOCUMENTS 4,892,398 A    1/1990 Kudo et al.
2006/0238894 A1*  10/2006 Sano ........................ G02B 9/12
                                                        359/714
(Continued)

FOREIGN PATENT DOCUMENTS

CN          1499220 A      5/2004
CN        102053341 A      5/2011
(Continued)

OTHER PUBLICATIONS

Chinese Search Report issued in corresponding Chinese application No. 201811512730.4, dated Dec. 31,2019(20 pages).
(Continued)

*Primary Examiner* — Anthony J Daniels

(57) ABSTRACT

The disclosure provides a collimating lens, a projecting module, and a mobile phone. An object side of the collimating lens is defined as adjacent to a laser transmitter, an image side of the collimating lens is defined as adjacent to an object to be measured. Along an optical axis from the object side to the image side, the collimating lens sequentially includes a first lens, a second lens, a third lens and a stop. An object side surface of the first lens is convex, an object side surface of the second lens is concave surface, an object side surface of the third lens is convex, and an image side surface of the third lens is convex. The stop is positioned between the third lens and the object to be measured. The material of each of the first lens, the second lens, and the third lens is plastic.

20 Claims, 10 Drawing Sheets

(51) Int. Cl.
*G02B 13/00* (2006.01)
*G02B 7/00* (2021.01)
*G02B 27/30* (2006.01)
*H04M 1/02* (2006.01)
*H04N 9/31* (2006.01)

(52) U.S. Cl.
CPC .......... *G02B 27/30* (2013.01); *H04M 1/0264* (2013.01); *H04N 5/2254* (2013.01); *H04N 9/3161* (2013.01)

(58) Field of Classification Search
USPC .......................................................... 348/335
See application file for complete search history.

(56) References Cited

U.S. PATENT DOCUMENTS

| | | | |
|---|---|---|---|
| 2008/0180814 A1 | 7/2008 | Kawasaki et al. | |
| 2011/0013070 A1 | 1/2011 | Hirao et al. | |
| 2017/0269340 A1 | 9/2017 | Shmunk | |
| 2019/0137733 A1* | 5/2019 | Gong | G02B 13/16 |
| 2021/0364744 A1* | 11/2021 | Wang | G02B 13/06 |

FOREIGN PATENT DOCUMENTS

| | | |
|---|---|---|
| CN | 105043725 A | 11/2015 |
| CN | 107505689 A | 12/2017 |
| CN | 107861317 A | 3/2018 |
| CN | 108279485 A | 7/2018 |
| CN | 108318996 A | 7/2018 |
| CN | 208092311 U | 11/2018 |
| CN | 109557650 A | 4/2019 |
| JP | 2005308963 A | 11/2005 |
| JP | 2018077291 A | 5/2018 |

OTHER PUBLICATIONS

International Search Report issued in corresponding international application No. PCT/CN2019/113104, dated Jan. 22, 2020(8 pages).
Written opinion of International Search Report issued in corresponding international application No. PCT/CN2019/113104, dated Jan. 22, 2020(5 pages).
SIPO, Supplementary Search Report for CN Application No. 2018115127304, dated Mar. 9, 2020.
SIPO, Notification to Grant Patent Right for Invention for CN Application No. 2018115127304, dated Apr. 7, 2020.

* cited by examiner

COLLIMATING LENS, PROJECTING MODULE AND MOBILE PHONE

CROSS REFERENCE TO RELATED APPLICATION(S)

This application is a continuation of International Application No. PCT/CN2019/113104, filed on Oct. 24, 2019, titled "COLLIMATING CAMERA LENS AND PROJECTING MODULE". The International Application No. PCT/CN2019/113104 claims priority to a Chinese application No. 2018115127304, filed on Dec. 11, 2018, titled "COLLIMATING CAMERALENS AND PROJECTING MODULE". The entirety of the above-mentioned applications is hereby incorporated by reference herein.

TECHNICAL FIELD

The disclosure relates to the field of camera technologies, and more particularly, to a collimating lens, a projecting module and a mobile phone.

BACKGROUND

With the rapid development of smart phones, innovative technologies have also emerged about camera functions of smart phones, such as 3D imaging technology introduced by Apple Inc. This optical sensing technology is based on 3D structured-light, can be used for face recognition and gesture recognition, can enhance the function of taking photos, bring new AR applications, transform optical images from the past two-dimensional to the three-dimensional space, thereby bringing a more realistic and clear perception experience.

The technology of 3D structured-light refers to that, after projecting specific laser information on a surface of an object, it is collected by a camera, and the information of the position, the depth and the like of the object is calculated based on the change of the light information caused by the object, thereby reconstructing the three-dimensional space. Such collimating lens, that projects an array of point light sources with specific emitting solid angle on a specific laser surface onto the surface of the object to be measured, is a sticking point for the quality of the 3D imaging technology.

However, in the conventional smart phones, the focal length f of the lens changes greatly with the change of the temperature in the environment, this results in a significant change in the angle of light projected by the lens, which will change the original light information and cause a deviation occurred in the calculation of the entire system, that is, the accuracy of reconstructing the contour of the 3D object is affected. Meanwhile, the projected image point becomes larger as the temperature changes, this will also cause the clarity of the system restoring the 3D object is reduced. In the case of temperature changes, it is particularly important that, the field of view (FOV) and the spot size of the light information that is projected to the object to be measure do not change significantly.

In addition, a first lens of a conventional collimating lens close to a laser transmitter is a molded glass lens. Such a molded glass lens is small, difficult to produce and process, low in yield, and difficult to mass produce, which greatly increases production costs.

SUMMARY

An object of the disclosure is to provide a collimating lens, a projecting module and a mobile phone to solve the above problems.

The embodiments of the disclosure achieve the foregoing object through the following technical solutions.

In a first aspect, the disclosure provides a collimating lens. An object side of the collimating lens is defined as adjacent to a laser transmitter, an image side of the collimating lens is defined as adjacent to an object to be measured. Along an optical axis from the object side to the image side, the collimating lens sequentially includes a first lens, a second lens, a third lens and a stop. The first lens has a positive refractive power, an object side surface of the first lens is a convex surface. The second lens has a negative refractive power, an object side surface of the second lens is a concave surface. The third lens has a positive refractive power, an object side surface of the third lens is a convex surface or substantially is a plane, and an image side surface of the third lens is a convex surface. The stop is positioned between the third lens and the measured object. The material of each of the first lens, the second lens, and the third lens is plastic. The collimating lens satisfies the following expressions:

$(dn/dt)_1 < -30 \times 10^{-6}/° C.;$ $(dn/dt)_2 < -30 \times 10^{-6}/° C.;$ $(dn/dt)_3 < -30 \times 10^{-6}/° C.;$ where $(dn/dt)_1$ represent a temperature coefficient of refractive index of the first lens in a range of 0~60° C., $(dn/dt)_2$ represent a temperature coefficient of refractive index of the second lens in a range of 0~60° C., $(dn/dt)_3$ represent a temperature coefficient of refractive index of the third lens in a range of 0~60° C.

In a second aspect, the disclosure provides a projecting module, which includes the above collimating lens. The projecting module further includes a light source and a diffractive optical element. Light beams emitted from the light source are converged by the collimating lens and expanded by the diffractive optical element, and then patterned structured-light beams are projected outward.

In a third aspect, the disclosure further provides a mobile phone, including the above-mentioned projecting module.

Compared with the prior art, the collimating lens and the projecting module provided by the disclosure definitely limit the temperature coefficient of refractive index of the three lenses, which is used to reasonably match the thermal expansion characteristics of the lenses, thereby achieving stable focal length, low cost and being suitable for various temperature occasions.

These or other aspects of the disclosure will become apparent and understandable in the description of the following embodiments.

REFERENCE NUMERALS OF MAIN COMPONENTS

Figure 1:
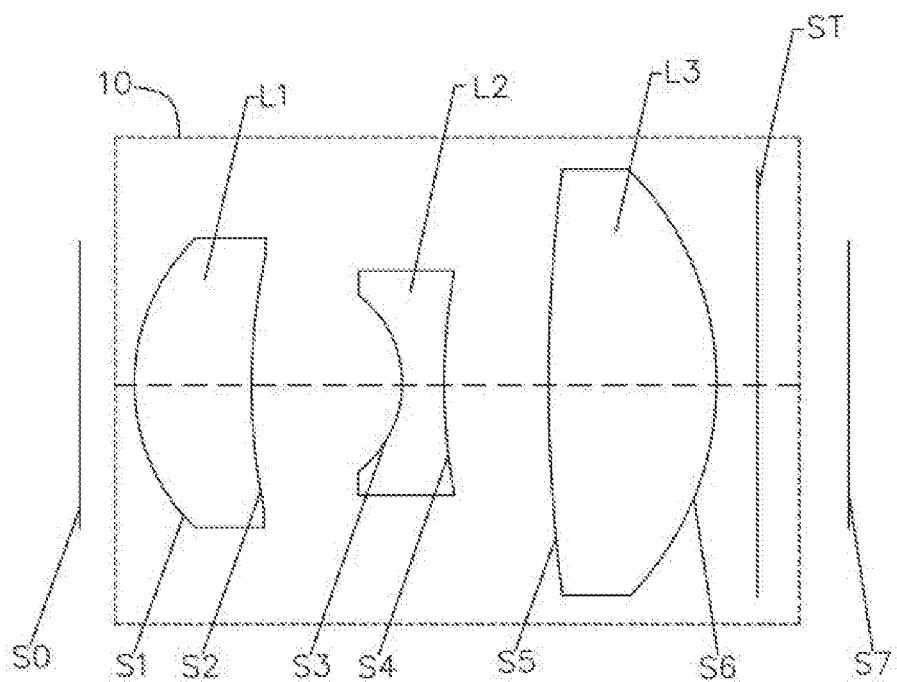
FIG. 1 is a schematic structural diagram of a collimating lens according to a first embodiment of the disclosure.

| first lens | L1 | second lens | L2 |
| third lens | L3 | stop | ST |
| light source | 60 | diffraction optical component | 50 |

The following specific embodiments will further explain the disclosure with reference to the above drawings.

DETAILED DESCRIPTION OF PREFERRED EMBODIMENTS

In order to better understand the disclosure, the disclosure will be further explained below with reference to the accompanying drawings. The drawings illustrate embodiments of the disclosure, but the disclosure is not limited to these embodiments. Instead, the purpose of providing these embodiments is to make the disclosure more thorough and comprehensive.

The disclosure provides a collimating lens, whose object side is defined as adjacent to a laser transmitter and whose image side is defined as adjacent to an object to be measured. Along an optical axis from the object side to the image side, the collimating lens sequentially includes a first lens, a second lens, a third lens and a stop. The first lens has a positive refractive power, an object side surface of the first lens is a convex surface. The second lens has a negative refractive power, an object side surface of the second lens is a concave surface. The third lens has a positive refractive power, an object side surface of the third lens is a convex surface or substantially is a plane, and an image side surface of the third lens is a convex surface. The stop is positioned between the third lens and the object to be measured. The material of each of the first lens, the second lens, and the third lens is plastic.

The first lens has a positive refractive power, and the object side surface of the first lens is convex, thereby converging telecentric light beams from the laser transmitter. The first lens further provides enough positive refractive power, which can effectively control the overall volume of the lens group.

The second lens has a negative refractive power, and the object side surface of the second lens is concave, which can effectively adjust aberrations generated by the first lens and control the focusing ability in the working band.

The third lens has a positive refractive power, and the image side surface of the third lens is convex, which can effectively correct aberrations of the collimating lens and can effectively control the light exit angle.

The object side surfaces and the image side surfaces of the first lens, the second lens, and the third lens are aspheric surfaces, that is, the object side surfaces and the image side surfaces of the first lens, the second lens, and the third lens are made into shapes other than a spherical surface, thereby obtaining more control variables to reduce aberrations.

The first lens, the second lens, and the third lens are all made of plastic, thereby effectively reducing production costs.

The collimating lens satisfies the following expressions:

$(dn/dt)_1 < -30 \times 10^{-6}/° C.;$ $(dn/dt)_2 < -30 \times 10^{-6}/° C.;$ $(dn/dt)_3 < -30 \times 10^{-6}/° C.;$ where $(dn/dt)_1$ represent a temperature coefficient of refractive index of the first lens in a range of 0~60° C., $(dn/dt)_2$ represent a temperature coefficient of refractive index of the second lens in a range of 0~60° C., $(dn/dt)_3$ represent a temperature coefficient of refractive index of the third lens in a range of 0~60° C.

These expressions limit the rate of change of the refractive index of the first lens, the second lens and the third lens with temperature, which is mainly used for reasonably matching thermal expansion characteristics of the lenses, thereby ensuring the stability of the focal length of the collimating lens under different temperatures.

In one embodiment, the collimating lens of the disclosure satisfies the following expression:

$5.581 \leq f/r_1 \leq 6.496;$ where f represents a focal length of the collimating lens, $r_1$ represents a radius of curvature of the object side surface of the first lens. This expression limits the shape of the object side surface of the first lens, it is beneficial to the processing and manufacturing of the first lens, while reducing tolerance sensitivity.

In one embodiment, the collimating lens of the disclosure satisfies the following expression:

$-0.7 < r_1/r_6 < 0;$ where $r_1$ represents a radius of curvature of the object side surface of the first lens, $r_6$ represents a radius of curvature of the image side surface of the third lens. This expression limits the object side surface of the first lens faces away from the image side surface of the third lens, it is mainly used to focus lights passing through the third lens on an imaging surface, while reducing the aberration of the collimating lens.

In one embodiment, the collimating lens of the disclosure satisfies the following expression:

$$-1 < f_2/f_1 < 0;$$

where $f_2$ represents a focal length of the second lens, $f_1$ represents a focal length of the first lens. This expression limits the ratio of the first lens to the second lens, which can effectively the aberration of the collimating lens.

In one embodiment, the collimating lens of the disclosure satisfies the following expression:

$$0.3 < CT_2/CT_1 < 0.7;$$

where $CT_1$ represents a center thickness of the first lens, $CT_2$ represents a center thickness of the second lens. This expression limits the ratio of the center thickness of the second lens to the center thickness of the first lens. It is beneficial to the processing and manufacturing of the collimating lens by appropriately setting the center thicknesses of the lenses.

In one embodiment, the collimating lens of the disclosure satisfies the following expression:

$$0 < CT/TD < 0.6;$$

where CT represents the sum of the center thicknesses of the first lens, the second lens and the third lens, TD represents a distance from the object side surface of the first lens to the image side surface of the third lens along the optical axis.

In one embodiment, the collimating lens of the disclosure satisfies the following expression:

$$-1 < r_3/f < 0;$$

where $r_3$ represents a radius of curvature of the object side surface of the second lens, f represents the focal length of the collimating lens. Satisfying this expression, a back focal length of the system can be shortened and a total optical length of the collimating lens can be reduced.

In one embodiment, the collimating lens of the disclosure satisfies the following expression:

$$6 < TTL/ImgH < 9;$$

where TTL represents a total optical length of the collimating lens, ImgH represents a half image height of the collimating lens. This expression limits a total length of the lens system and ensures that a good imaging quality of the system.

In one embodiment, the collimating lens of the disclosure satisfies the following expression:

$$0.738 \leq TTL/f \leq 0.815;$$

where TTL represents the total optical length of the collimating lens, f represents the focal length of the collimating lens. This expression limits a proportional relationship between the total length of the system and the focal length of the system, thereby achieving the purpose of miniaturization of the system while ensuring a long focal length of the system. Specifically, the total optical length TTL of the collimating lens is less than 3.2 mm and the focal length f of the collimating lens is greater than 3.6 mm, can be defined, in order to ensure better optical characteristics and more suitable for the implementation of 3D structured-light algorithms.

In one embodiment, the collimating lens of the disclosure satisfies the following expression:

$$0.4 < r_1/r_2 < 0.55;$$

where $r_1$ represents a radius of curvature of the object side surface of the first lens, $r_2$ represents a radius of curvature of the image side surface of the first lens.

In one embodiment, the collimating lens of the disclosure satisfies the following expression:

$$-0.6 < r_3/r_4 < 0;$$

where $r_3$ represents a radius of curvature of the object side surface of the second lens, $r_4$ represents a radius of curvature of the image side surface of the second lens.

In one embodiment, the collimating lens of the disclosure satisfies the following expression:

$$-51 < r_5/r_6 < -8;$$

where $r_5$ represents a radius of curvature of the object side surface of the third lens, $r_6$ represents a radius of curvature of the image side surface of the third lens.

In one embodiment, the collimating lens of the disclosure satisfies the following expression:

$$0.7 < CT_1/CT_3 < 0.9;$$

where $CT_1$ represents a center thickness of the first lens, $CT_3$ represents a center thickness of the third lens.

In one embodiment, the collimating lens of the disclosure satisfies the following expressions:

$$D_3 > D_1 > D_2;$$

where $D_1$ represents the maximum diameter of the first lens, $D_2$ represents the maximum diameter of the second lens, $D_3$ represents the maximum diameter of the third lens.

In one embodiment, the object side surfaces and the image side surfaces of the first lens, the second lens, and the third lens are aspheric surfaces, thereby obtaining more control variables to reduce aberrations.

In one embodiment, the total optical length of the collimating lens is less than 3.2 mm, which is beneficial to the miniaturization of the collimating lens.

In one embodiment, the disclosure further provides a projecting module, which includes the collimating lens of any one of the above-mentioned embodiments. The projecting module further includes a light source and a diffractive optical element. Light beams emitted from the light source are converged by the collimating lens and expanded by the diffractive optical element, and then patterned structured-light beams are projected outward.

The collimating lens and the projecting module provided by the disclosure use three plastic lenses, has a smaller size of the collimating lens and a lower cost, and the temperature coefficient of refractive index of each lens is distributed more appropriately, which can offset the influence of the thermal expansion of the lenses themselves and other structural elements on the focal length, so it can achieve a stable focal length and is suitable for various temperature occasions. The collimating lens provided by the disclosure can achieve that, effective focal length changes less than 0.001 mm for every 10° C. change in temperature, so the angle of light projected by the collimating lens is substantially not changed, that is, the original light information is not changed. Compared with the prior art, under the laser transmitter having the same size, the collimating lens of the disclosure can achieve a larger focal length and a smaller FOV, so it is more conducive to the implementation of the 3D structured-light algorithms, meanwhile the cost is lower.

In the embodiments of the disclosure, relevant parameters of every lens in the collimating lens are shown in Tables 1, 3, 5 and 7, where r represents a radius of curvature of the apex of an optical surface, d represents a distance between optical surfaces (a distance between the apexes of two adjacent optical surfaces), $n_d$ represents a refractive index of every lens, and Vd represents an abbe number of every lens, configured for measuring the degree of light dispersion of a medium. Optical characteristics corresponding to every embodiment are shown in Table 9, where f represents the focal length of the collimating lens, TTL represents the total optical length of the collimating lens, NA represents the numerical aperture.

Aspheric parameters of every lens of the collimating lens are shown in Tables 2, 4, 6 and 8. The shapes of aspherical surfaces of the collimating lens in every embodiment satisfy the following expression:

$$z = \frac{ch^2}{1 + \sqrt{1 - (1+k)c^2h^2}} + Bh^4 + Ch^6 + Dh^8 + Eh^{10} + Fh^{12},$$

where z represents a vector height between a point on a curved surface and a vertex of the curved surface along an optical axis, c represents a curvature of the vertex of the curved surface, K represents a quadratic surface coefficient, h represents a distance between the point on the curved surface and the optical axis, B represents a fourth order surface coefficient, C represents a sixth order surface coefficient, D represents an eighth order surface coefficient, E represents a tenth order surface coefficient, F represents a twelfth order surface coefficient.

The disclosure is further described by the following embodiments. In the following embodiments, the thickness and the radius of curvature of every lens in the collimating lens are different, and the specific differences can be referred to the parameter tables of the embodiments.

Embodiment 1

Please refer to FIG. 1, FIG. 1 is a schematic structural diagram of a collimating lens 10 provided by an embodiment of the disclosure. An object side S0 of the collimating lens 10 is defined as adjacent to a laser transmitter, and an image side S7 of the collimating lens 10 is defined as adjacent to a measured object. From the object side S0 to the image side S7, the collimating lens 10 sequentially includes a first lens L1, a second lens L2, a third lens L3 and a stop ST.

The first lens L1 has a positive refractive power, an object side surface S1 of the first lens L1 is a convex surface and an image side surface S2 of the first lens L1 is a concave surface.

The second lens L2 has a negative refractive power, an object side surface S3 and an image side surface S4 of the second lens L2 both are concave surfaces.

The third lens L3 has a positive refractive power, an object side surface S5 of the third lens L3 is a convex surface, and an image side surface S6 of the third lens L3 is a convex surface.

The stop ST is positioned between the third lens L3 and the measured object. The optical center of each of the lenses is located on a same straight line. The material of each of the lenses is plastic. The collimating lens 10 satisfies the following expressions:

$(dn/dt)_1 < -30 \times 10^{-6}/°\ C.;$ $(dn/dt)_2 < -30 \times 10^{-6}/°\ C.;$ $(dn/dt)_3 < -30 \times 10^{-6}/°\ C.;$ where $(dn/dt)_1$ represent a temperature coefficient of refractive index of the first lens L1 in a range of 0~60° C., $(dn/dt)_2$ represent a temperature coefficient of refractive index of the second lens L2 in a range of 0~60° C., $(dn/dt)_3$ represent a temperature coefficient of refractive index of the third lens L3 in a range of 0~60° C.

Relevant parameters of every lens in the collimating lens 10 of this embodiment are shown in Table 1.

TABLE 1

| Surface No. | | Surface type | r | d | $n_d$ | $V_d$ |
|---|---|---|---|---|---|---|
| S0 | Object surface | | — | 0.245 | | |
| S1 | First lens | Aspherical surface | 0.700 | 0.482 | 1.640 | 23.529 |
| S2 | | Aspherical surface | 1.676 | 0.660 | | |
| S3 | Second lens | Aspherical surface | −0.619 | 0.170 | 1.516 | 57.038 |
| S4 | | Aspherical surface | 1.060 | 0.833 | | |
| S5 | Third lens | Aspherical surface | 9.235 | 0.563 | 1.640 | 23.529 |
| S6 | | Aspherical surface | −1.130 | 0.400 | | |
| ST | Stop | | — | 300.000 | | |
| S7 | Imaging surface | | — | — | | |

Aspherical parameters of every lens in this embodiment are shown in Table 2.

TABLE 2

| Surface No. | k | B | C | D | E | F |
|---|---|---|---|---|---|---|
| S1 | −0.302 | −1.91E−01 | 2.41E+00 | −1.35E+01 | 3.73E+01 | −4.06E+01 |
| S2 | 7.476 | −6.23E−01 | 2.85E+00 | −2.46E+01 | 8.68E+01 | −1.46E+02 |
| S3 | 0.528 | −7.85E+00 | 2.52E+01 | −1.13E+02 | 5.59E+02 | 0.00E+00 |
| S4 | −43.158 | −2.34E+00 | 1.33E+01 | −2.14E+01 | 9.26E+00 | 3.93E+00 |
| S5 | −82.660 | 4.77E−03 | −1.82E−01 | 3.35E−01 | −2.23E−01 | 4.86E−02 |
| S6 | −0.229 | 4.02E−02 | −4.61E−02 | 2.22E−02 | 3.99E−02 | −1.48E−02 |

Figure 2:
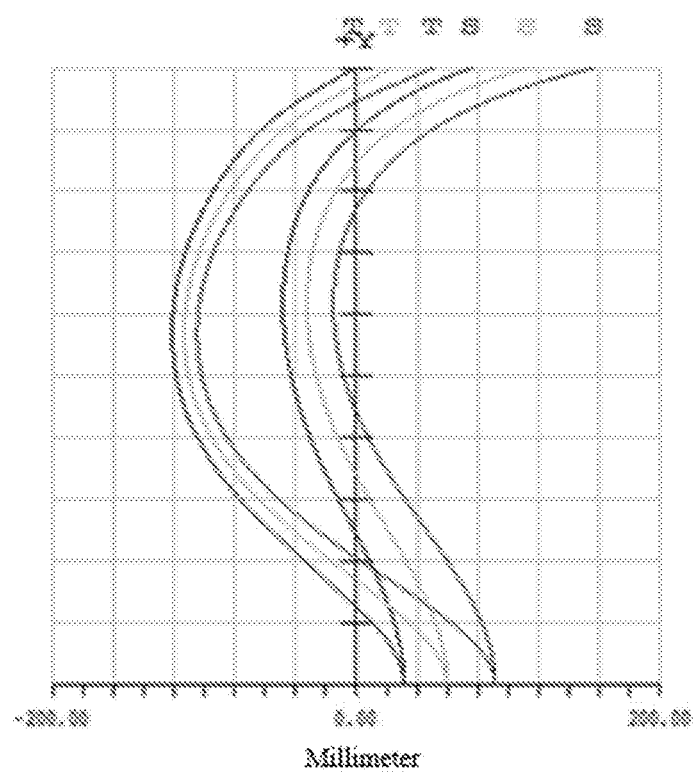
FIG. 2 is a diagram showing field curvature curves of the collimating lens according to the first embodiment of the disclosure.
Figure 3:
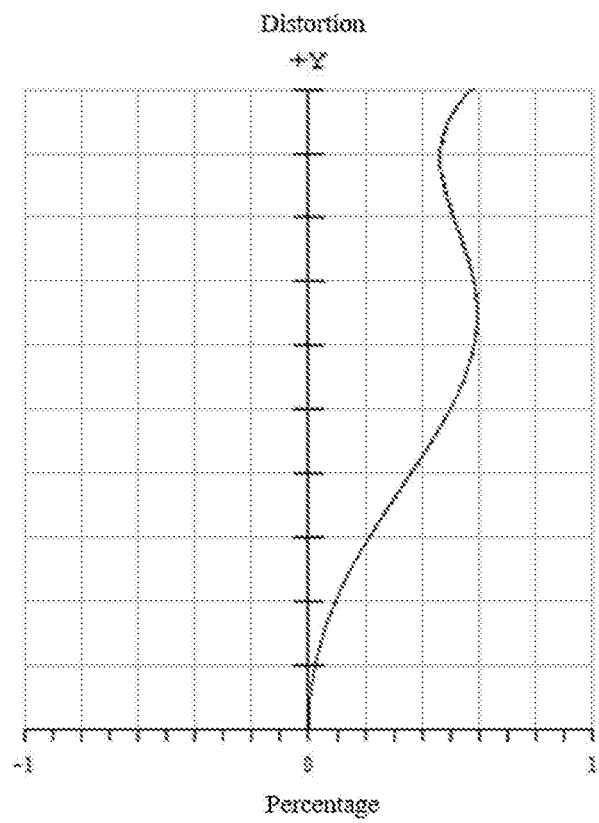
FIG. 3 is a diagram showing a distortion curve of the collimating lens according to the first embodiment of the disclosure.
Figure 4:
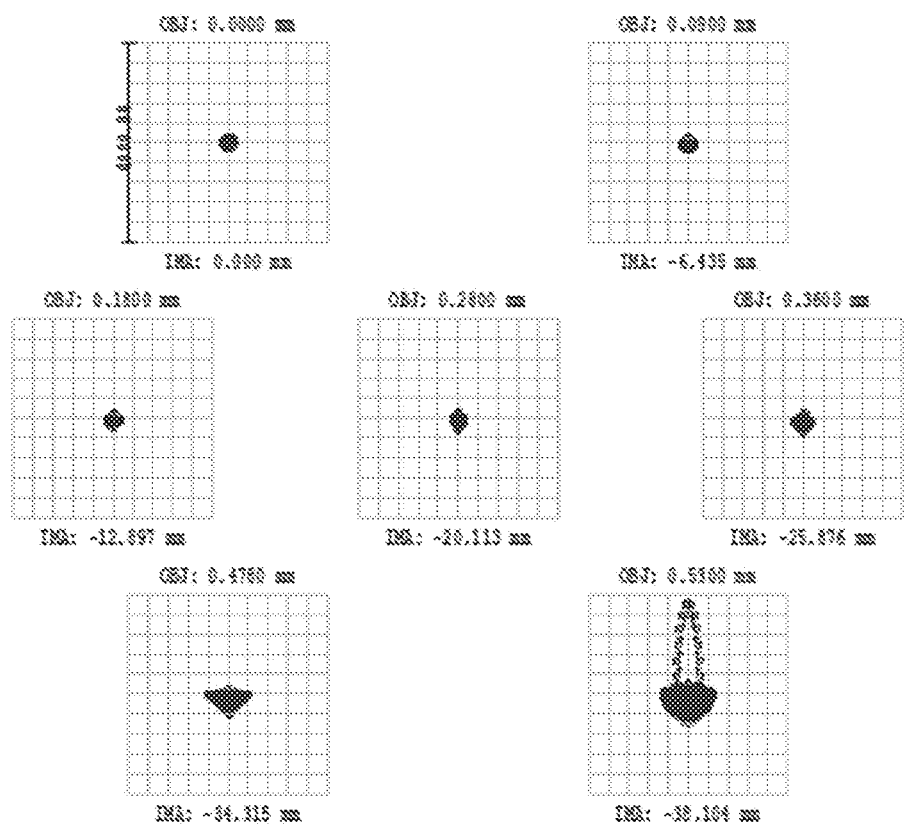
FIG. 4 is a diagram showing sizes and shapes of spots formed by the collimating lens according to the first embodiment of the disclosure.

In this embodiment, FIG. 2 is a diagram showing field curvature curves of the collimating lens when imaging at 40° C. and an image distance of 300 mm. The x-axis in the FIG. 2 is field curvature value in millimeters, and the y-axis is FOV defined by the height of the object. FIG. 3 is a diagram showing a distortion curve of the collimating lens when imaging at 40° C. and the image distance of 300 mm. The x-axis is distortion value in percent, and the y-axis is FOV defined by the height of the object. FIG. 4 is a diagram showing imaging spots with different sizes and shapes when the collimating lens imaging at 40° C. and the image distance of 300 mm, the unit is micron, from left to right and from up to bottom, the object height and the image height both increase gradually.

The smaller the data range of the imaging spots is, the better the lens performance is. As can be seen from FIG. 2 to FIG. 4, the aberration can be corrected well in this embodiment.

Embodiment 2

Figure 5:
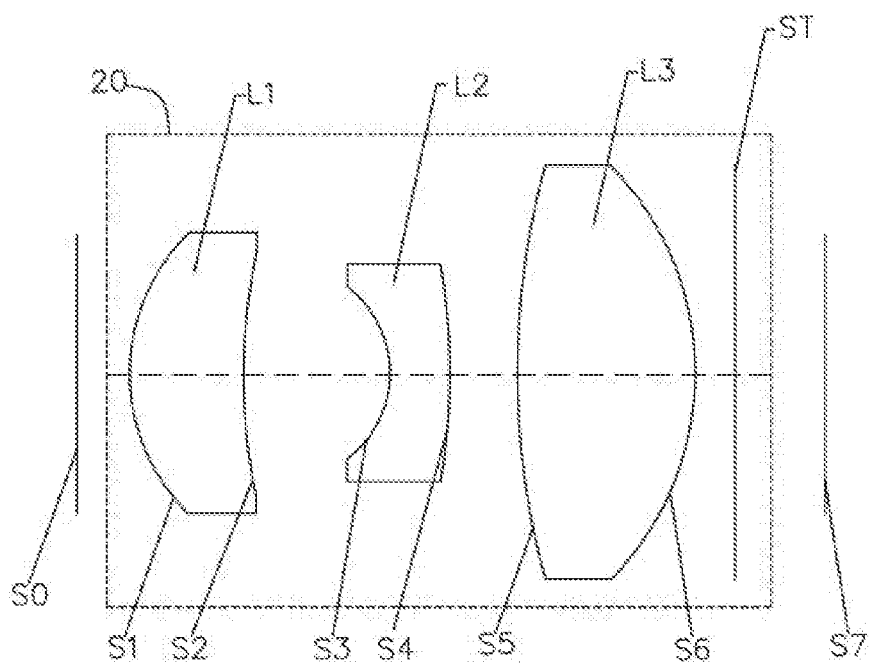
FIG. 5 is a schematic structural diagram of a collimating lens according to a second embodiment of the disclosure.

FIG. 5 is a schematic structure diagram of a collimating lens 20 provided in this embodiment. The structure diagram of the collimating lens provided in this embodiment is substantially similar to that of the first embodiment, except that relevant parameters of every lens are different.

The relevant parameters of every lens in the collimating lens 20 in this embodiment are shown in Table 3.

TABLE 3

| Surface No. | Surface type | r | d | $n_d$ | $V_d$ |
|---|---|---|---|---|---|
| S0 | Object surface | — | 0.420 | | |
| S1 | First lens | Aspherical surface | 0.646 | 0.395 | 1.640 | 23.529 |
| S2 | | Aspherical surface | 1.289 | 0.823 | | |
| S3 | Second lens | Aspherical surface | −0.513 | 0.266 | 1.516 | 57.038 |
| S4 | | Aspherical surface | 14.889 | 0.657 | | |
| S5 | Third lens | Aspherical surface | 5.288 | 0.525 | 1.640 | 23.529 |
| S6 | | Aspherical surface | −1.233 | 0.350 | | |
| ST | Stop | | — | 300.000 | | |
| S7 | Imaging surface | | — | — | | |

Aspherical parameters of every lens in this embodiment are shown in Table 4.

TABLE 4

| Surface No. | k | B | C | D | E | F |
|---|---|---|---|---|---|---|
| S1 | −0.818 | −9.79E−01 | 1.33E+01 | −8.81E+01 | 3.24E+02 | −4.53E+02 |
| S2 | −2.370 | −1.37E+00 | 2.43E+01 | −2.37E+02 | 1.20E+03 | −2.28E+03 |
| S3 | 0.821 | −2.80E+00 | −1.83E+01 | 4.62E+02 | −4.07E+03 | 1.93E+04 |
| S4 | −90.092 | −2.16E+00 | 4.17E+00 | 2.31E+01 | −1.43E+02 | 2.90E+02 |
| S5 | −46.983 | 1.26E−02 | −4.96E−01 | 1.19E+00 | −1.12E+00 | 4.56E−01 |
| S6 | 0.193 | 8.03E−02 | −9.47E−02 | −1.38E−02 | 3.12E−01 | −1.77E−01 |

Figure 6:
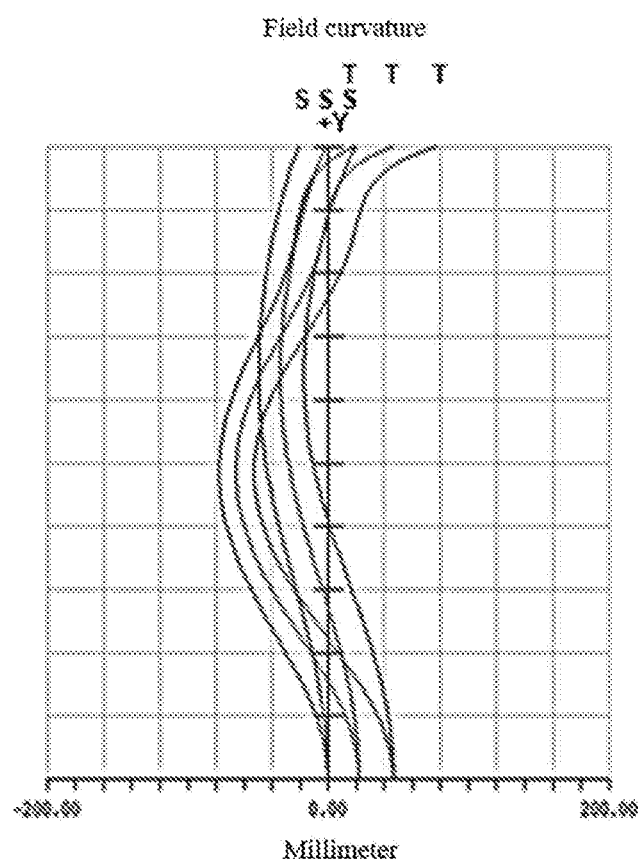
FIG. 6 is a diagram showing field curvature curves of the collimating lens according to the second embodiment of the disclosure.
Figure 7:
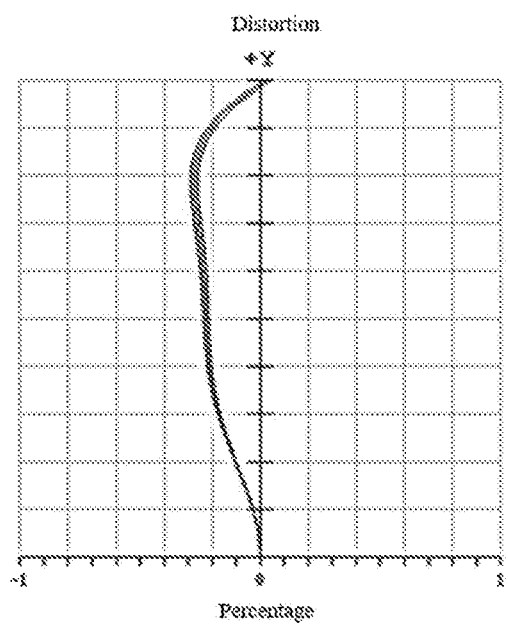
FIG. 7 is a diagram showing a distortion curve of the collimating lens according to the second embodiment of the disclosure.
Figure 8:
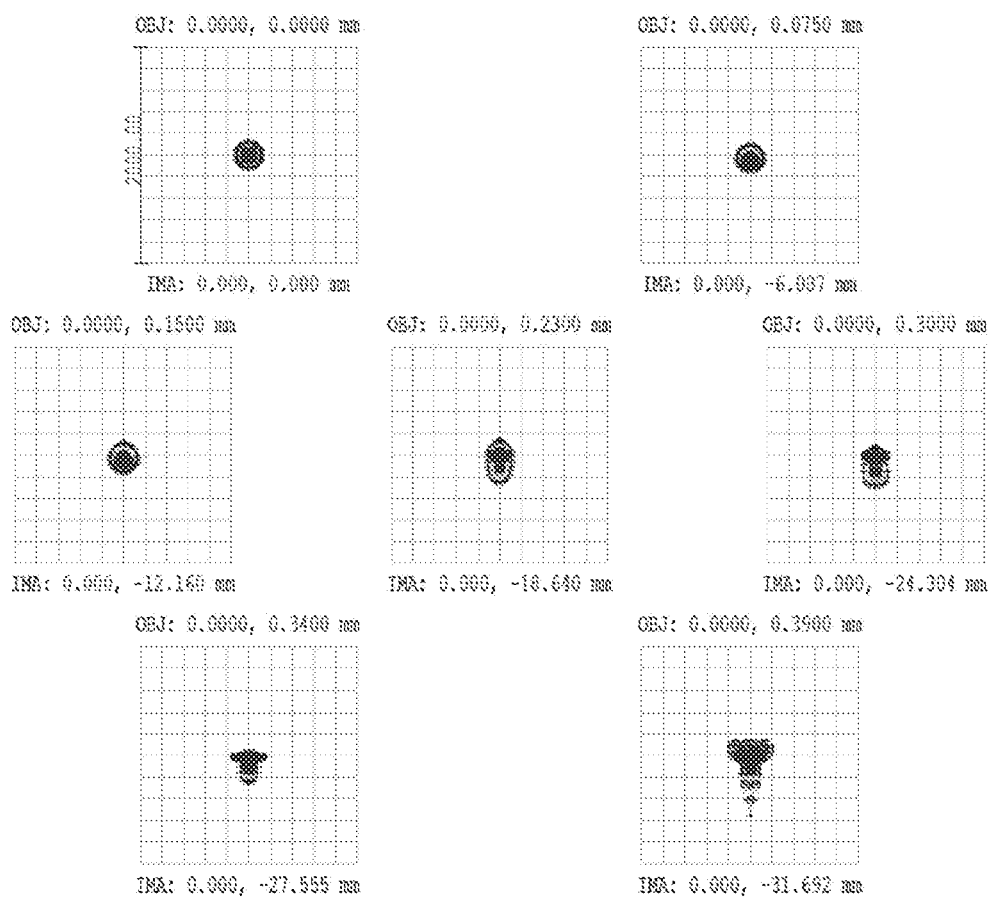
FIG. 8 is a diagram showing sizes and shapes of spots formed by the collimating lens according to the second embodiment of the disclosure.

In this embodiment, FIG. 6 is a diagram showing field curvature curves of the collimating lens when imaging at 40° C. and an image distance of 300 mm. FIG. 7 is a diagram showing a distortion curve of the collimating lens when imaging at 40° C. and an image distance of 300 mm. FIG. 8 is a diagram showing sizes and shapes of imaging spots when the collimating lens imaging at 40° C. and an image distance of 300 mm.

The smaller the data range of the imaging spots is, the better the lens performance is. As can be seen from FIG. 6 to FIG. 8, the aberration can be corrected well in this embodiment.

Embodiment 3

Figure 9:
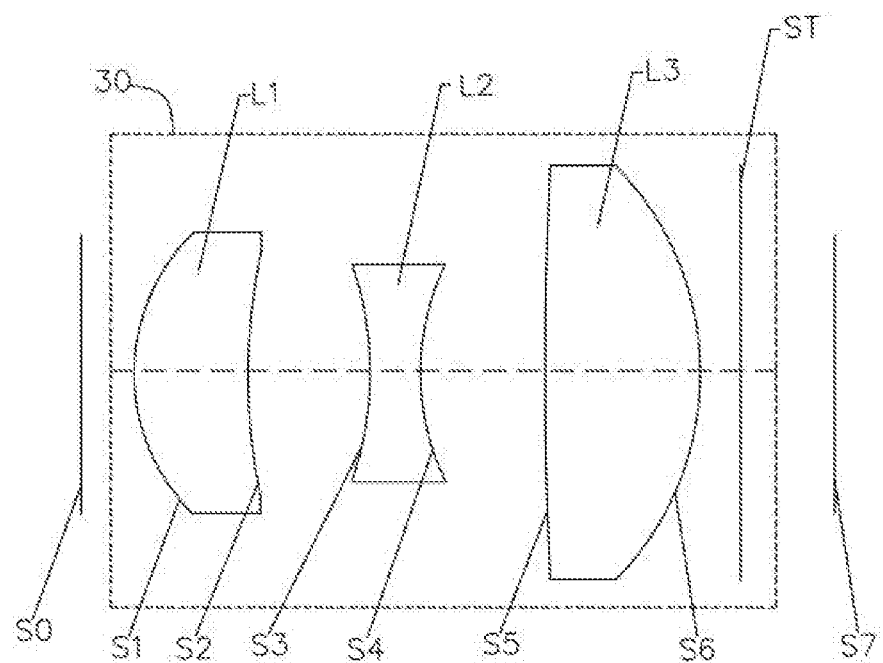
FIG. 9 is a schematic structural diagram of a collimating lens according to a third embodiment of the disclosure.

FIG. 9 is a schematic structure diagram of a collimating lens 30 provided in this embodiment. The structure diagram of the collimating lens provided in this embodiment is substantially similar to that of the first embodiment, except that relevant parameters of every lens are different.

In particular, an object side surface S5 of a third lens is substantially flat in this embodiment, a radius of curvature of the object side surface S5 is 21.774.

The relevant parameters of every lens in the collimating lens 30 in this embodiment are shown in Table 5.

TABLE 5

| Surface No. | Surface type | r | d | $n_d$ | $V_d$ |
|---|---|---|---|---|---|
| S0 | Object surface | | — | 0.250 | | |
| S1 | First lens | Aspherical surface | 0.647 | 0.524 | 1.640 | 23.529 |
| S2 | | Aspherical surface | 1.412 | 0.592 | | |
| S3 | Second lens | Aspherical surface | −0.726 | 0.170 | 1.640 | 23.529 |
| S4 | | Aspherical surface | 1.232 | 0.773 | | |
| S5 | Third lens | Aspherical surface | 21.774 | 0.641 | 1.640 | 23.529 |
| S6 | | Aspherical surface | −1.054 | 0.400 | | |
| ST | Stop | | — | 300.000 | | |
| S7 | Imaging surface | | — | — | | |

Aspherical parameters of every lens in this embodiment are shown in Table 6.

TABLE 6

| Surface No. | k | B | C | D | E | F |
|---|---|---|---|---|---|---|
| S1 | −0.715 | −4.58E−01 | 4.93E+00 | −1.98E+01 | 4.06E+01 | −3.52E+01 |
| S2 | 2.226 | −8.59E−01 | 4.69E+00 | −2.95E+01 | 6.81E+01 | −5.88E+01 |
| S3 | −2.965 | −8.18E+00 | 1.96E+01 | −1.91E+02 | 1.32E+03 | 0.00E+00 |
| S4 | −46.310 | −2.03E+00 | 1.12E+01 | −1.79E+01 | 9.95E+01 | −2.95E+02 |
| S5 | −78.787 | −5.53E−03 | −1.01E−01 | 5.38E−02 | 3.22E−01 | −2.73E−01 |
| S6 | −0.263 | 2.20E−02 | 3.87E−02 | −1.58E−01 | 2.07E−01 | −3.00E−02 |

Figure 10:
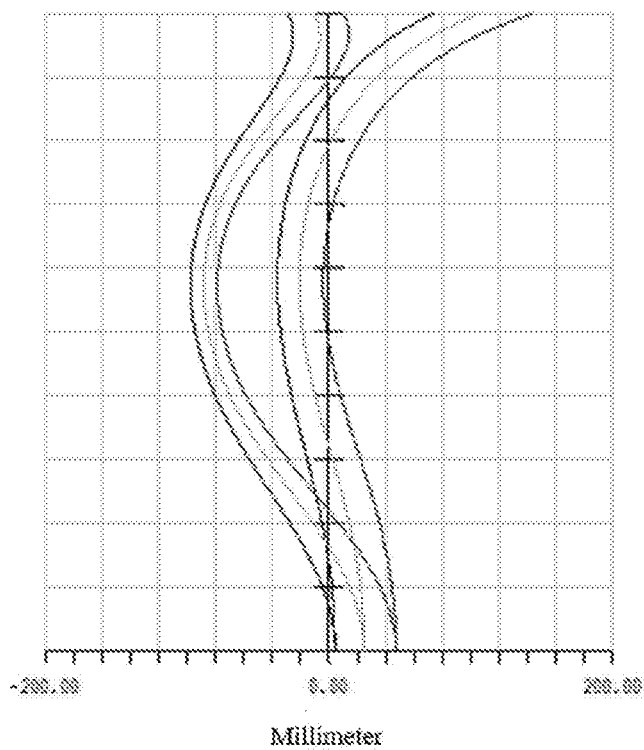
FIG. 10 is a diagram showing field curvature curves of the collimating lens according to the third embodiment of the disclosure.
Figure 11:
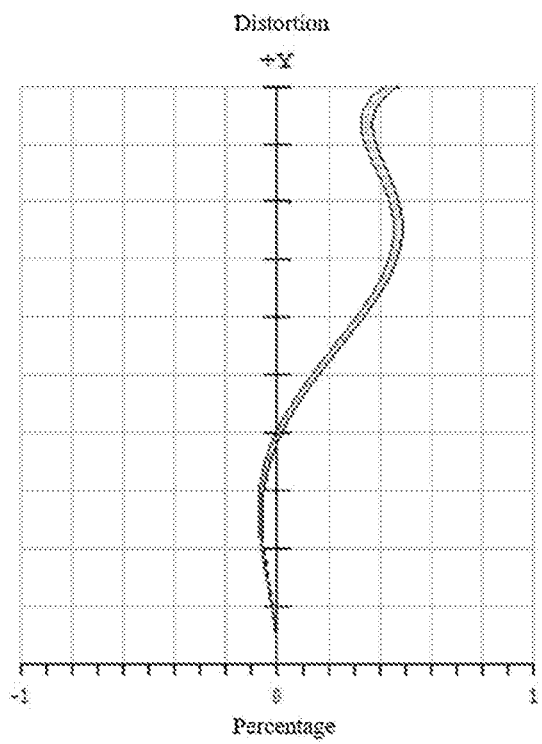
FIG. 11 is a diagram showing a distortion curve of the collimating lens according to the third embodiment of the disclosure.
Figure 12:
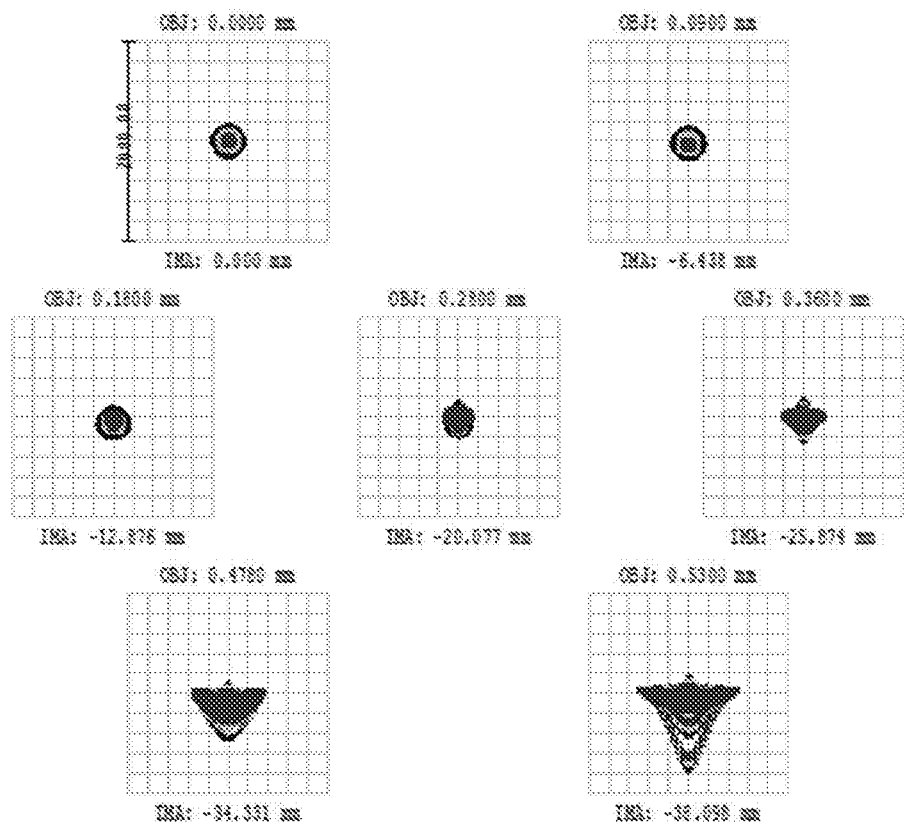
FIG. 12 is a diagram showing sizes and shapes of spots formed by the collimating lens according to the third embodiment of the disclosure.

In this embodiment, FIG. 10 is a diagram showing field curvature curves of the collimating lens when imaging at 40° C. and an image distance of 300 mm. FIG. 11 is a diagram showing a distortion curve of the collimating lens when imaging at 40° C. and an image distance of 300 mm. FIG. 12 is a diagram showing sizes and shapes of imaging spots when the collimating lens imaging at 40° C. and an image distance of 300 mm.

The smaller the data range of the imaging spots is, the better the lens performance is. As can be seen from FIG. 10 to FIG. 12, the aberration can be corrected well in this embodiment.

Embodiment 4

Figure 13:
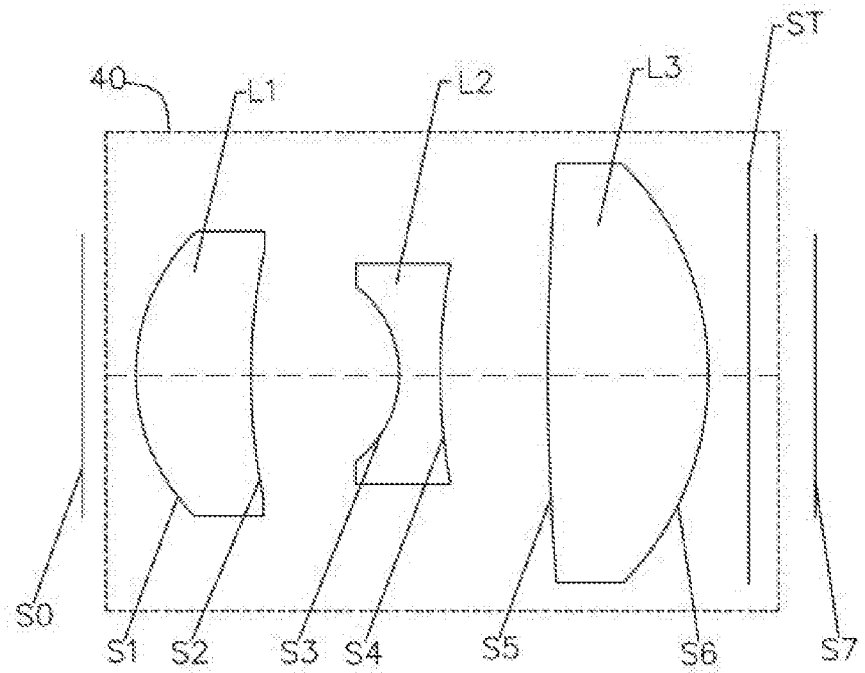
FIG. 13 is a schematic structural diagram of a collimating lens according to a fourth embodiment of the disclosure.

FIG. 13 is a schematic structure diagram of a collimating lens 40 provided in this embodiment. The structure diagram of the collimating lens provided in this embodiment is substantially similar to that of the first embodiment, except that relevant parameters of every lens are different.

In particular, an object side surface S5 of a third lens is substantially flat in this embodiment, a radius of curvature of the object side surface S5 is 54.356, which is larger than that of the third embodiment.

The relevant parameters of every lens in the collimating lens 40 in this embodiment are shown in Table 7.

TABLE 7

| Surface No. | Surface type | r | d | $n_d$ | $V_d$ |
|---|---|---|---|---|---|
| S0 | Object surface | — | 0.489 | | |
| S1 | First lens | Aspherical surface | 0.663 | 0.428 | 1.640 23.529 |
| S2 | | Aspherical surface | 1.595 | 0.705 | |
| S3 | Second lens | Aspherical surface | −0.596 | 0.200 | 1.516 57.038 |
| S4 | | Aspherical surface | 2.063 | 0.703 | |
| S5 | Third lens | Aspherical surface | 54.356 | 0.573 | 1.640 23.529 |
| S6 | | Aspherical surface | −1.067 | 0.350 | |
| ST | Stop | | — | 300.000 | |
| S7 | Imaging surface | | — | — | |

Aspherical parameters of every lens in this embodiment are shown in Table 8.

TABLE 8

| Surface No. | k | B | C | D | E | F |
|---|---|---|---|---|---|---|
| S1 | −0.735 | −7.40E−01 | 6.70E+00 | −3.86E+01 | 1.26E+02 | −1.51E+02 |
| S2 | 0.738 | −1.33E+00 | 1.10E+01 | −9.32E+01 | 4.12E+02 | −6.50E+02 |
| S3 | 0.044 | −5.13E+00 | −1.74E+01 | 2.25E+02 | −5.55E+02 | 1.01E+03 |
| S4 | 16.802 | −3.34E+00 | 1.23E+01 | −1.49E+01 | 3.70E+01 | −1.97E+02 |
| S5 | 40.038 | 4.57E−02 | −5.00E−01 | 9.75E−01 | −6.71E−01 | 1.38E−01 |
| S6 | −0.203 | 5.32E−02 | −8.18E−02 | −4.35E−03 | 1.17E−01 | −2.03E−02 |

Figure 14:
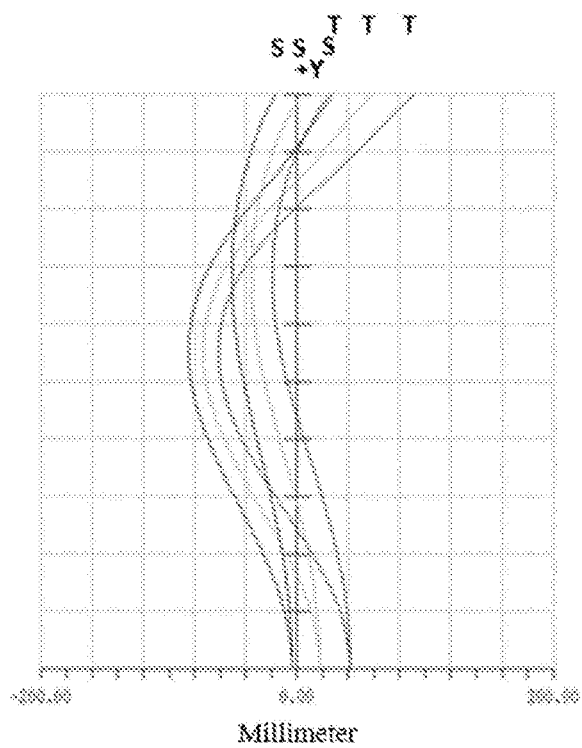
FIG. 14 is a diagram showing field curvature curves of the collimating lens according to the fourth embodiment of the disclosure.
Figure 15:
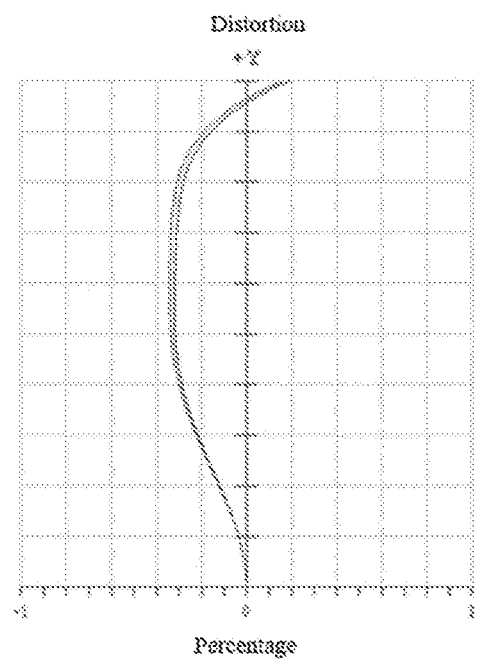
FIG. 15 is a diagram showing a distortion curve of the collimating lens according to the fourth embodiment of the disclosure.
Figure 16:
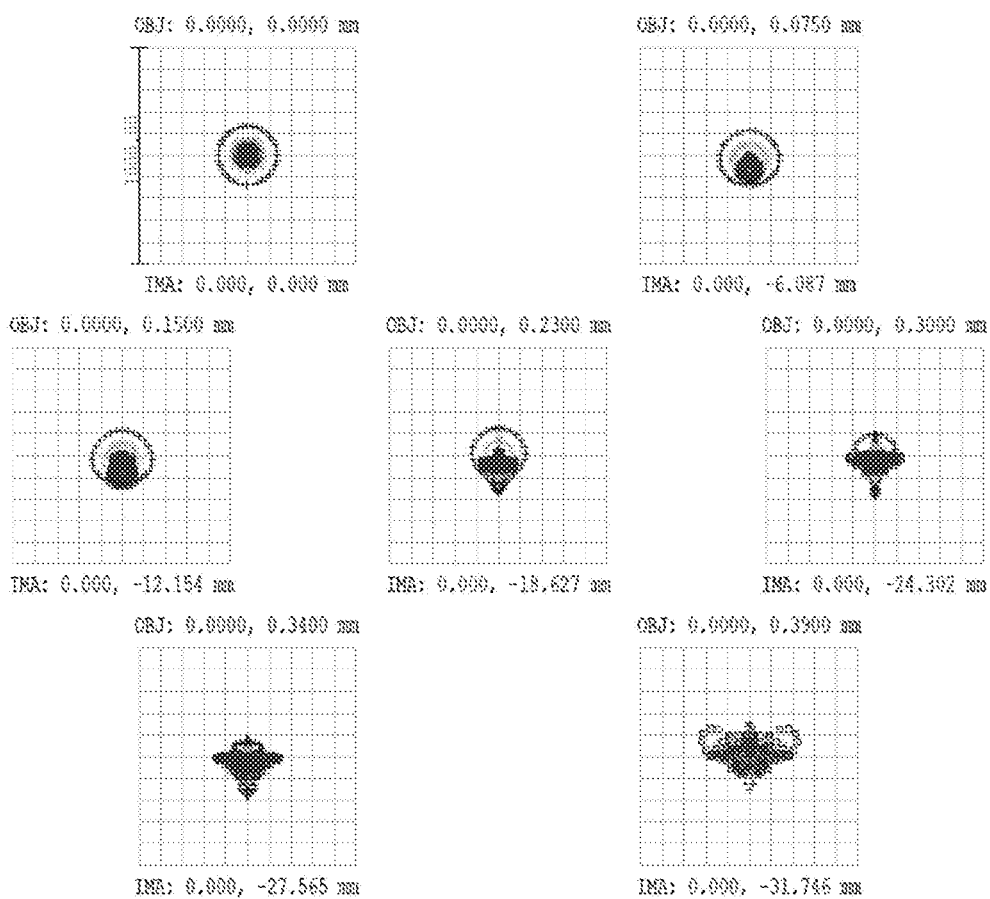
FIG. 16 is a diagram showing sizes and shapes of spots formed by the collimating lens according to the fourth embodiment of the disclosure.

In this embodiment, FIG. 14 is a diagram showing field curvature curves of the collimating lens when imaging at 40° C. and an image distance of 300 mm. FIG. 15 is a diagram showing a distortion curve of the collimating lens when imaging at 40° C. and the image distance of 300 mm. FIG. 16 is a diagram showing sizes and shapes of imaging spots when the collimating lens imaging at 40° C. and the image distance of 300 mm.

The smaller the data range of the imaging spots is, the better the lens performance is. As can be seen from FIG. 14 to FIG. 16, the aberration can be corrected well in this embodiment.

optical characteristics corresponding to the first to fourth embodiments are shown in Table 9.

TABLE 9

| Expression | Embodiment 1 | Embodiment 2 | Embodiment 3 | Embodiment 4 |
|---|---|---|---|---|
| TTL(mm) | 3.108 | 3.016 | 3.100 | 2.959 |
| f (mm) | 4.20 | 3.70 | 4.20 | 3.70 |
| NA | 0.18 | 0.19 | 0.18 | 0.2 |
| TTL/f | 0.740 | 0.815 | 0.738 | 0.80 |
| $(dn/dt)_1$ $(10^{-6}/°C.)$ | −109 | −109 | −109 | −109 |
| $(dn/dt)_2$ $(10^{-6}/°C.)$ | −389 | −389 | −109 | −389 |
| $(dn/dt)_3$ $(10^{-6}/°C.)$ | −109 | −109 | −109 | −109 |
| $f_2/f_1$ | −0.454 | −0.570 | −0.468 | −0.568 |
| $f/r_1$ | 6.004 | 5.725 | 6.496 | 5.581 |
| $r_1/r_6$ | −0.619 | −0.524 | −0.614 | −0.621 |
| $CT_2/CT_1$ | 0.459 | 0.674 | 0.324 | 0.486 |
| CT/TD | 0.437 | 0.445 | 0.494 | 0.406 |
| $r_3/f$ | −0.147 | −0.139 | −0.173 | −0.161 |
| TTL/ImgH | 5.864 | 7.732 | 5.849 | 7.587 |
| $r_1/r_2$ | 0.418 | 0.501 | 0.458 | 0.416 |
| $r_3/r_4$ | −0.584 | −0.034 | −0.589 | −0.289 |
| $r_5/r_6$ | −8.173 | −4.289 | −20.658 | −50.943 |
| $CT_1/CT_3$ | 0.856 | 0.752 | 0.817 | 0.747 |

Every lens of the collimating lenses provided by the disclosure has reasonable distribution in the rate of change of refractive index with temperature, so the collimating lenses can achieve stable focal length and can be used in various temperature occasions, thereby facilitating the implementation of 3D structured-light algorithms.

Embodiment 5

Figure 17:
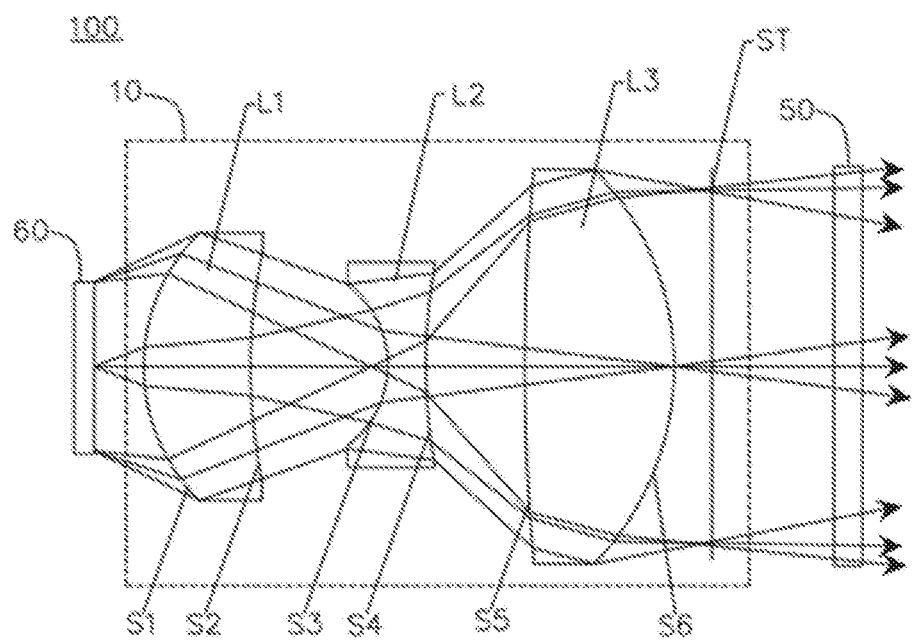
FIG. 17 is a schematic structural diagram of a projecting module according to a fifth embodiment of the disclosure.

As illustrated in FIG. 17, this embodiment provides a projecting module 100, which includes the collimating lens of any of the above-mentioned embodiments (e.g., the collimating lens 10). The projecting module 100 further includes a light source 60 and a diffraction optical element 50. The light beams emitted from the light source 60 are converged by the collimating lens 10 and expanded by the diffraction optical element 50, then structured-pattern beams are projected outward, and are projected toward an object to be measured.

The light source 60 may be a laser light source such as a visible light or an invisible light, for example, a vertical-cavity surface-emitting laser (VCSEL) or an infrared laser diode is used as the light source.

The projecting module 100 provided by the disclosure includes the collimating lens 10. Since the temperature coefficient of refractive index of each lens in the collimating lens 10 is properly distributed, the collimating lens 10 can achieve a stable focal length and can be applied to various temperature occasions. The projecting module 100 works as follows: light beams emitted from the light source 60 pass through the collimating lens 10 and the diffractive optical element 50, and then are projected toward an object to be measured; the projecting beams, after passing through the diffractive optical element 50, project patterned structured-light; a receiving module receives patterned structured-light information which is reflected from the object to be measured, and calculates information such as the position and the depth of the object, thereby reconstructing the three-dimensional space.

Embodiment 6

Figure 18:
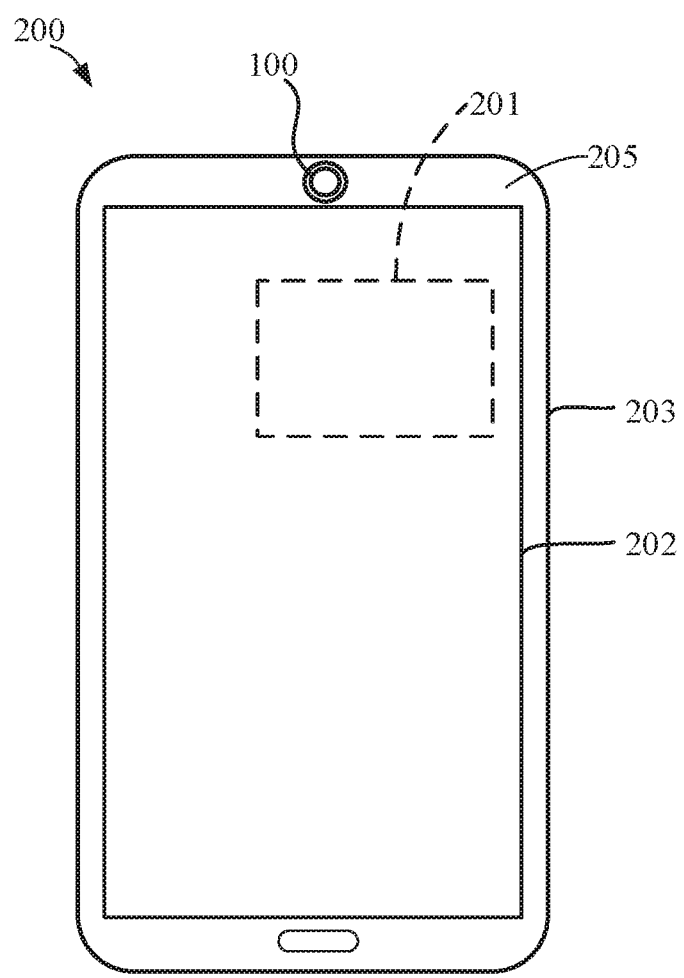
FIG. 18 is a schematic structural diagram of a mobile phone according to a sixth embodiment of the disclosure.

As illustrated in FIG. 18, the disclosure further provides a mobile phone 200, which includes the projecting module 100 as described above, a processor 201, a display screen 202, and a housing 203. The mobile phone 200 has a front surface 205, the display screen 202 is engaged with the housing 203 and exposed at the front surface 205. The display screen 202 may be a touch screen. The processor 201 is received in the housing 203. The projecting module 100 is substantially received in the housing 203, positioned above the display screen 202 and exposed from the front surface 205. The processor 201 is communicated with the projecting module 100 and a receiving module, the patterned structured-light information can be received by the receiving module and sent to the processor 201, and the processor 201 processes the information to reconstruct an object to be measured in the three-dimensional space.

One of ordinary skill in the art understands that the mobile phone 200 also includes other components, such as an antenna, a battery, a memory, an I/O module and so on.

The above embodiments just express several implementation manners of the disclosure, and the descriptions thereof are relatively specific and detailed, but cannot be understood as limiting the scope of the disclosure. It should be noted that, for those of ordinary skill in the art, without departing from the concept of the disclosure, modifications and improvements can be made, and these all belong to the scope of the disclosure. Therefore, the scope of the disclosure should be subject to the appended claims.

What is claimed is:

1. A collimating lens, whose object side is defined as adjacent to a laser transmitter and whose image side is defined as adjacent to an object to be measured, along an optical axis from the object side to the image side, the collimating lens sequentially comprising:
   a first lens with a positive refractive power, an object side surface of the first lens being convex,
   a second lens with a negative refractive power, an object side surface of the second lens being concave;
   a third lens with a positive refractive power, an objective side surface of the third lens being convex, an image side surface of the third lens being convex; and
   a stop, positioned between the third lens and the object to be measured;
   wherein materials of the first lens, the second lens and the third lens are plastic;
   the collimating lens meets the expressions:

$(dn/dt)_1 < -30 \times 10^{-6}/°C.$;

$(dn/dt)_2 < -30 \times 10^{-6}/°C.$;

$(dn/dt)_3 < -30 \times 10^{-6}/°C.$;

where $(dn/dt)_1$ represent a temperature coefficient of refractive index of the first lens in a range of 0~60° C., $(dn/dt)_2$ represent a temperature coefficient of refractive index of the second lens in a range of 0~60° C., $(dn/dt)_3$ represent a temperature coefficient of refractive index of the third lens in a range of 0~60° C.

2. The collimating lens as claimed in claim 1, wherein the collimating lens meets the expression:

$$5.581 \leq f/r_1 \leq 6.496;$$

where f represents a focal length of the collimating lens, $r_1$ represents a radius of curvature of the object side surface of the first lens.

3. The collimating lens as claimed in claim 1, wherein the collimating lens meets the expression:

$$-0.7 < r_1/r_6 < 0;$$

where $r_1$ represents a radius of curvature of the object side surface of the first lens, $r_6$ represents a radius of curvature of the image side surface of the third lens.

4. The collimating lens as claimed in claim 1, wherein the collimating lens meets the expression:

$$-1 < f_2/f_1 < 0;$$

$$-1 < r_3/f < 0;$$

where $f_2$ represents a focal length of the second lens, $f_1$ represents a focal length of the first lens, $r_3$ represents a radius of curvature of the object side surface of the second lens, f represents a focal length of the collimating lens.

5. The collimating lens as claimed in claim 1, wherein the collimating lens meets the expression:

$$0 < CT/TD < 0.6;$$

where CT represents the sum of center thicknesses of the first lens, the second lens and the third lens, TD represents a distance from the object side surface of the first lens to the image side surface of the third lens along the optical axis.

6. The collimating lens as claimed in claim 5, wherein the collimating lens meets the expression:

$$0.3 < CT_2/CT_1 < 0.7;$$

where $CT_1$ represents a center thickness of the first lens, $CT_2$ represents a center thickness of the second lens.

7. The collimating lens as claimed in claim 6, wherein the collimating lens meets the expression:

$$0.7 < CT_1/CT_3 < 0.9;$$

where $CT_1$ represents a center thickness of the first lens, $CT_2$ represents a center thickness of the second lens, $CT_3$ represents a center thickness of the third lens.

8. The collimating lens as claimed in claim 1, wherein the collimating lens meets the expression:

$$6 < TTL/ImgH < 9;$$

where TTL represents a total optical length of the collimating lens, ImgH represents a half image height of the collimating lens.

9. The collimating lens as claimed in claim 1, wherein the collimating lens meets the expression:

$$0.738 \leq TTL/f \leq 0.815;$$

where TTL represents a total optical length of the collimating lens, f represents a focal length of the collimating lens.

10. The collimating lens as claimed in claim 1, wherein each of the object side surfaces of the first to the third lenses is an aspheric surface, and each of the image side surfaces of the first to the third lenses is an aspheric surface.

11. The collimating lens as claimed in claim 1, wherein a total optical length of the collimating lens is less than 3.2 mm.

12. The collimating lens as claimed in claim 1, wherein the collimating lens meets the expression:

$$0.4 < r_1/r_2 < 0.55;$$

where $r_1$ represents a radius of curvature of the object side surface of the first lens, $r_2$ represents a radius of curvature of the image side surface of the first lens.

13. The collimating lens as claimed in claim 12, wherein the collimating lens meets the expression:

$$-0.6 < r_3/r_4 < 0;$$

where $r_3$ represents a radius of curvature of the object side surface of the second lens, $r_4$ represents a radius of curvature of the image side surface of the second lens.

14. The collimating lens as claimed in claim 13, wherein the collimating lens meets the expression:

$$-51 < r_5/r_6 < -8;$$

where $r_5$ represents a radius of curvature of the object side surface of the third lens, $r_6$ represents a radius of curvature of the image side surface of the third lens.

15. The collimating lens as claimed in claim 1, wherein the collimating lens meets the expression:

$$D_3 > D_1 > D_2;$$

where $D_1$ represents the maximum diameter of the first lens, $D_2$ represents the maximum diameter of the second lens, $D_3$ represents the maximum diameter of the third lens.

16. A projecting module, comprising:
a light source, configured for emitting light beams;
a lens group, configured for collimating the light beams emitted from the light source, wherein the lens group comprises a first lens with a positive refractive power, a second lens with a negative refractive power, a third lens with a positive refractive power, and a stop, the first lens is positioned between the light source and the second lens, the third lens is positioned between the second lens and the stop; and
a diffractive element, adjacent to the stop and configured for diffracting the collimated light beams from the lens group;
wherein the lens group meets the expressions:

$$(dn/dt)_1 < -30 \times 10^{-6}/° C.;$$

$$(dn/dt)_2 < -30 \times 10^{-6}/° C.;$$

$$(dn/dt)_3 < -30 \times 10^{-6}/° C.;$$

where $(dn/dt)_1$ represent a temperature coefficient of refractive index of the first lens in a range of 0~60° C., $(dn/dt)_2$ represent a temperature coefficient of refractive index of the second lens in a range of 0~60° C., $(dn/dt)_3$ represent a temperature coefficient of refractive index of the third lens in a range of 0~60° C.

17. The projecting module as claimed in claim 16, wherein the lens group meets the expressions:

$$5.581 \leq f/r_1 \leq 6.496;$$

$$-0.7 < r_1/r_6 < 0;$$

$$-1 < f_2/f_1 < 0;$$

$$-1 < r_3/f < 0;$$

where f represents a focal length of the lens group, $r_1$ represents a radius of curvature of an object side surface of the first lens, $r_3$ represents a radius of curvature of an object side surface of the second lens, $r_6$ represents a radius of curvature of an image side surface of the third lens, $f_2$ represents a focal length of the second lens, $f_1$ represents a focal length of the first lens.

18. The projecting module as claimed in claim 16, wherein the lens group meets the expressions:

$0.7<CT_1/CT_3<0.9;$ $0.3<CT_2/CT_1<0.7;$ $0<CT/TD<0.6;$ where $CT_1$ represents a center thickness of the first lens, $CT_2$ represents a center thickness of the second lens, $CT_3$ represents a center thickness of the third lens, CT represents the sum of center thicknesses of the first lens, the second lens and the third lens, TD represents a distance from an object side surface of the first lens to an image side surface of the third lens on an optical axis.

19. The projecting module as claimed in claim 16, wherein the lens group meets the expressions:

$D_3>D_1>D_2;$ where $D_1$ represents the maximum diameter of the first lens, $D_2$ represents the maximum diameter of the second lens, $D_3$ represents the maximum diameter of the third lens.

20. A mobile phone, comprising a projecting module, a processor, and a housing, wherein the projecting module and the processor are received in the housing, the projecting module is configured to project structured-lights toward an object, the processor is communicated with the projecting module and configured to reconstruct the object in a three-dimensional space according to the structured-lights reflected by the object, the projecting module comprises:

a light source, configured for emitting light beams;

a stop;

a lens group, positioned between the light source and the stop, from an object side adjacent to the light source to an image side adjacent to the stop, the lens group comprising a first lens, a second lens, and a third lens in sequence, the first lens having a positive refractive power and a convex object side surface, the second lens having a negative refractive power and a concave object side surface, the third lens having a positive refractive power, a convex object side surface and a convex image side surface, the lens group being configured for collimating light beams emitted from the light source; and a diffractive element, adjacent to the stop and configured for diffracting collimated light beams from the lens group;

wherein the lens group meets the expressions:

$(dn/dt)_1<-30\times10^{-6}/°\ C.;$ $(dn/dt)_2<-30\times10^{-6}/°\ C.;$ $(dn/dt)_3<-30\times10^{-6}/°\ C.;$ $5.581\leq f/r_1\leq 6.496;$ $-0.7<r_1/r_6<0;$ $-1<f_2/f_1<0;$ $-1<r_3/f<0;$ $0.7<CT_1/CT_3<0.9;$ $0.3<CT_2/CT_1<0.7;$ $0<CT/TD<0.6;$ where $(dn/dt)_1$ represent a temperature coefficient of refractive index of the first lens in a range of 0~60° C., $(dn/dt)_2$ represent a temperature coefficient of refractive index of the second lens in a range of 0~60° C., $(dn/dt)_3$ represent a temperature coefficient of refractive index of the third lens in a range of 0~60° C., f represents a focal length of the lens group, $r_1$ represents a radius of curvature of the object side surface of the first lens, $r_3$ represents a radius of curvature of the object side surface of the second lens, $r_6$ represents a radius of curvature of the image side surface of the third lens, $f_2$ represents a focal length of the second lens, $f_1$ represents a focal length of the first lens, $CT_1$ represents a center thickness of the first lens, $CT_2$ represents a center thickness of the second lens, $CT_3$ represents a center thickness of the third lens, CT represents the sum of center thicknesses of the first lens, the second lens and the third lens, TD represents a distance from an object side surface of the first lens to an image side surface of the third lens on an optical axis.

\* \* \* \* \*